US008881212B2

United States Patent
Bagasra et al.

(10) Patent No.: US 8,881,212 B2
(45) Date of Patent: Nov. 4, 2014

(54) HOME NETWORK MANAGEMENT

(75) Inventors: Abbas Bagasra, Concord, MA (US); Sanjay Udani, Arlington, VA (US); Nabil N. Bitar, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 910 days.

(21) Appl. No.: 12/647,581

(22) Filed: Dec. 28, 2009

(65) Prior Publication Data
US 2011/0162013 A1    Jun. 30, 2011

(51) Int. Cl.
*H04N 7/173* (2011.01)
*H04N 7/16* (2011.01)
*H04N 21/436* (2011.01)
*H04N 21/442* (2011.01)
*H04L 12/28* (2006.01)
*H04W 28/20* (2009.01)

(52) U.S. Cl.
CPC .... *H04N 21/44227* (2013.01); *H04L 2012/285* (2013.01); *H04L 12/2807* (2013.01); *H04L 12/283* (2013.01); *H04W 28/20* (2013.01); *H04N 21/43615* (2013.01)
USPC .............................. 725/95; 725/116; 725/146

(58) Field of Classification Search
USPC ........................ 725/74, 78, 95, 96, 116, 146
See application file for complete search history.

(56) References Cited

U.S. PATENT DOCUMENTS

| | | | |
|---|---|---|---|
| 6,169,570 B1 * | 1/2001 | Suzuki ............................. | 725/87 |
| 6,469,982 B1 | 10/2002 | Henrion et al. | |
| 6,646,988 B1 | 11/2003 | Nandy et al. | |
| 6,816,456 B1 | 11/2004 | Tse-Au | |
| 7,394,985 B1 * | 7/2008 | Wang et al. ..................... | 725/81 |
| 7,630,314 B2 | 12/2009 | Dos Remedios et al. | |
| 8,116,317 B2 * | 2/2012 | Zuberi ............................ | 725/78 |
| 2003/0133476 A1 * | 7/2003 | Stone et al. ................... | 370/537 |
| 2004/0028054 A1 | 2/2004 | Khurana et al. | |
| 2004/0031056 A1 * | 2/2004 | Wolff .............................. | 725/73 |
| 2004/0190528 A1 | 9/2004 | Dacosta | |
| 2005/0286559 A1 * | 12/2005 | Miernik et al. ............... | 370/468 |
| 2006/0153214 A1 | 7/2006 | Moore et al. | |
| 2006/0215650 A1 | 9/2006 | Wollmershauser et al. | |
| 2007/0027983 A1 | 2/2007 | Bowra et al. | |
| 2007/0058612 A1 | 3/2007 | Bushmitch | |
| 2008/0232250 A1 * | 9/2008 | Park .............................. | 370/235 |
| 2008/0310301 A1 | 12/2008 | Wade et al. | |
| 2008/0313666 A1 * | 12/2008 | Evenson ........................ | 725/28 |
| 2008/0320540 A1 | 12/2008 | Brooks et al. | |
| 2009/0074007 A1 | 3/2009 | Yonge et al. | |
| 2010/0011390 A1 * | 1/2010 | Coles et al. .................... | 725/25 |
| 2010/0050215 A1 * | 2/2010 | Wester et al. .................. | 725/82 |
| 2011/0162013 A1 | 6/2011 | Bagasra et al. | |
| 2011/0270987 A1 | 11/2011 | Schlansker et al. | |

* cited by examiner

*Primary Examiner* — Randy Flynn

(57) ABSTRACT

A method includes storing, at a first network device configured to communicate with at least one set top box (STB) and at least one digital video recorder (DVR), information identifying parameters associated with bandwidth in a home network. The method may also include receiving, at a first network device in the home network, a request having a corresponding first bandwidth and identifying a class of traffic associated with the request. The method may further include determining whether the first bandwidth is less than an available bandwidth associated with the identified class of traffic, approving the request when the first bandwidth is less than the available bandwidth, and modifying the available bandwidth associated with the identified class of traffic in response to approving the request.

19 Claims, 10 Drawing Sheets

HOME NETWORK MANAGEMENT

BACKGROUND INFORMATION

Service providers offer customers a wide range of telecommunication services, including video, telephony and data services. Customer locations, such as a customer's home, often include many user devices that simultaneously access these services. As a result, home networks that allow users to share access to these services are becoming increasingly complex.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to managing bandwidth in a customer's home network. In one exemplary implementation, the management of bandwidth in the customer's home network is distributed by a service provider to one or more devices in the customer's home network. The home management device may then make decisions to grant/deny requests for bandwidth without consulting the service provider. In other instances, the management of the bandwidth may be shared between the service provider and the user's home management device. In each case, the bandwidth may be managed in accordance with a service level associated with the particular customer's service and/or parameters associated with a customer's home network.

Figure 1:
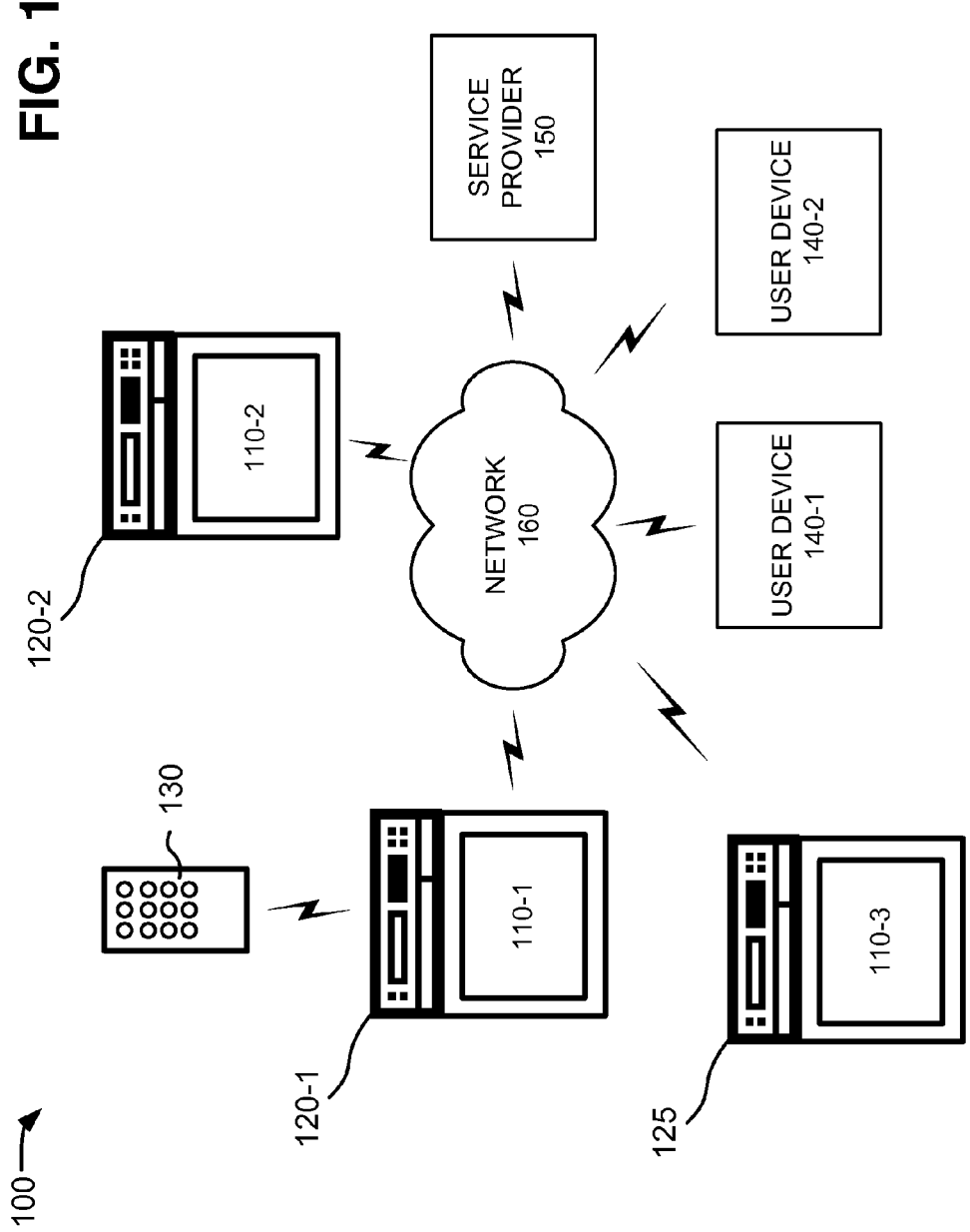
FIG. 1 illustrates an exemplary network in which systems and methods described herein may be implemented.

FIG. 1 is a diagram of an exemplary network 100 in which systems and methods described herein may be implemented. As illustrated, network 100 may include televisions (TVs) 110-1 to 110-3 (collectively "televisions 110" and individually "television 110"), STBs 120-1 and 120-2 (collectively "STBs 120" and individually "STB 120"), a digital video recorder (DVR) 125, a remote control 130, user devices 140-1 and 140-2 (collectively "user devices 140" and individually "user device 140"), a service provider 150 and network 160. Components of network 100 may interconnect via wired and/or wireless connections.

Televisions 110 may include any display device capable of displaying video content provided by STB 120, DVR 125, and/or content provided by other devices (e.g., a digital video disk (DVD) player, a video camera, a home media player, etc., not shown) connected to television 110.

STBs 120 and DVR 125 may include devices that receive television programming (e.g., from service provider 150), and provide the television programming to television 110 or another device. STBs 120 and DVR 125 may allow users to alter the programming provided to television 110 based on a signal (e.g., a channel up or channel down signal, etc.) from remote control 130 and/or user device 140. Furthermore, DVR 125 may record video in a digital format to a disk drive or other memory medium within DVR 125. In one exemplary implementation, features of STBs 120 and/or DVR 125 may be incorporated directly within televisions 110. Consistent with implementations described herein, STBs 120 and DVR 125 may be configured to display content stored on another one of STBs 120 and/or DVRs 125. This feature may be referred to as a "multi-room DVR" (MDVR). The terms "set top box" and "digital video recorder" as used herein should be construed to include any device used to receive signals from an external source and output the signals for viewing or playing, Remote control 130 may include a device that allows a user to control programming and/or content displayed on television 110 via interaction with STBs 120 and/or DVR 125. Furthermore, remote control 130 may facilitate interaction with selecting and/or order various content that may be displayed on an interactive media guide (IMG).

User devices 140 may each include a laptop or notebook computer, a personal computer (PC), an ultra mobile personal computer (UMPC), a netbook, or other types of computation or communication devices, threads or processes running on these devices, and/or objects executable by these devices. User device 140 may also include any type of communication device, such as a voice over Internet protocol (VoIP) telephone (e.g., a session initiation protocol (SIP) telephone), a wireless or cellular telephone device (e.g., a personal communications system (PCS) terminal that may combine a cellular radiotelephone with data processing and data communications capabilities, a personal digital assistant (PDA) that can include a radio, or the like), a mobile telephone (e.g., a cell phone), a smart phone (e.g., that may combine a cellular radio with data processing and data communications capabilities), etc. In one implementation, user device 140 may include any device (e.g., an Internet Protocol (IP)-based device) that is capable of accessing services (e.g., Internet services) provided by service provider 150 via network 160. In other implementations, user device 140 may be configured to interact with STBs 120, DVR 125, and/or television 110, via a local network (e.g., a home wired or wireless network). User devices 140 may connect to network 160 via wired, wireless, or optical connections.

Service provider 150 may include one or more computing devices, servers and/or backend systems that are able to connect to network 160 and transmit and/or receive information via network 160. In one implementation, service provider 150 may include a server (e.g., a computer system or an application), a cable head-end, or a broadcaster capable of providing content (e.g., TV programming, movies, on-demand services, live television, news feeds, blog feeds, widgets, applications, etc.), advertisements, instructions, codes, encryption keys, and/or other information associated with products and/or services, etc., to STBs 120 and/or DVR 125. In some implementations, service provider 150 may be configured to receive information from STBs 120, DVR 125, televisions 110, user devices 140, or other devices in network 100, as described in detail below.

Network 160 may include one or more wired, wireless and/or optical networks that are capable of receiving and transmitting data, voice and/or video signals, including multimedia signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, although three televisions 110, two STBs 120, one DVR 125, one remote control 130, two user devices 140, one service provider 150, and one network 160 have been illustrated in FIG. 1, in practice, there may be more televisions 110, STBs 120, DVRs 125, remote controls 130, user devices 140, service providers 150, and/or networks 160. Network 100 may also include additional elements, such as switches, gateways, routers, backend systems, etc., that aid in routing information, such as media streams from service provider 150 to STBs 110 and/or DVR 125. Also, in some instances, one or more of the components of network 100 may perform one or more functions described as being performed by another one or more of the components of network 100.

Figure 2:
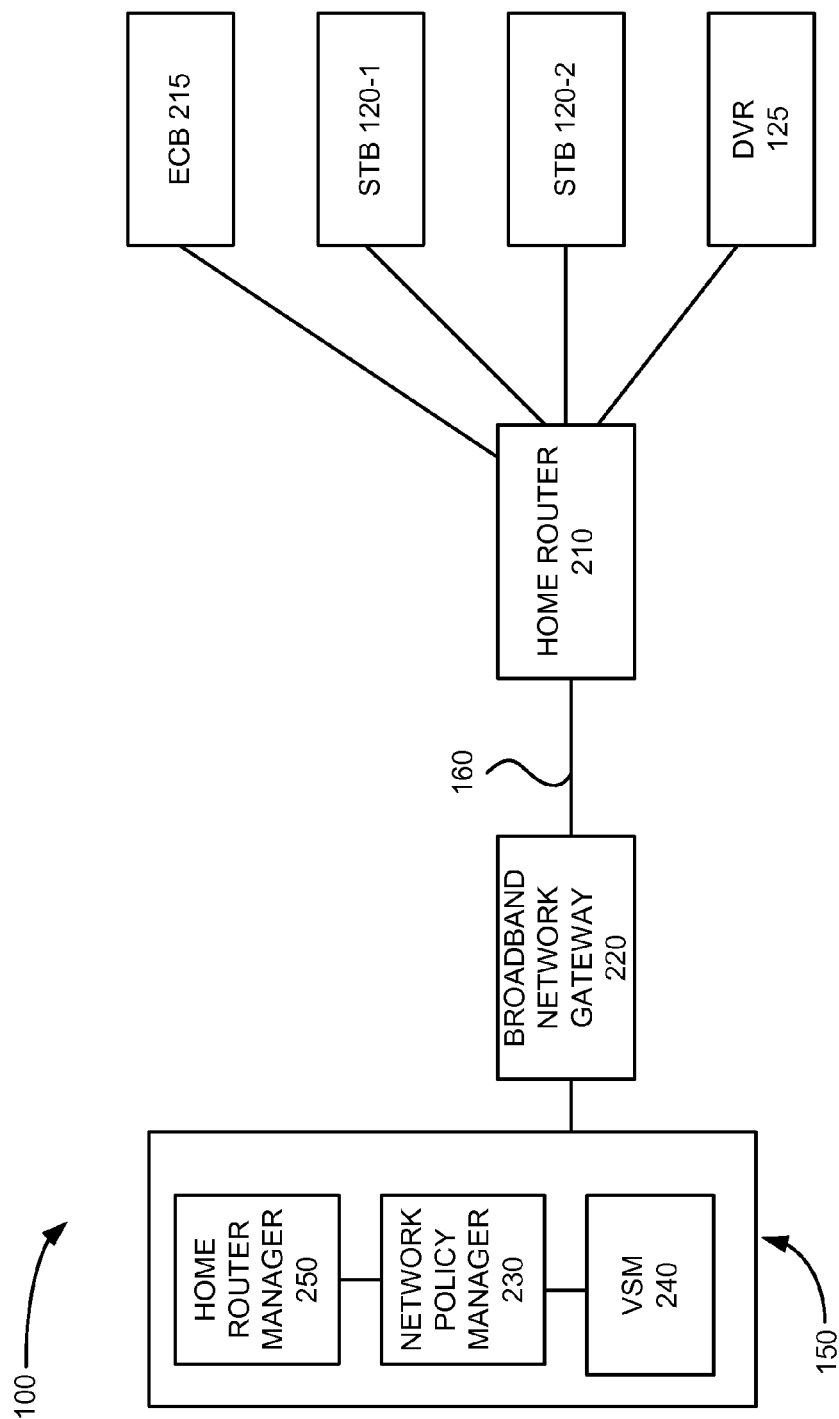
FIG. 2 illustrates an exemplary configuration of components implemented in the network of FIG. 1.

FIG. 2 illustrates exemplary components implemented in a portion of network 100. Referring to FIG. 2, network 100 may include home router 210, Ethernet coax bridge (ECB) 215, broadband network gateway (BNG) 220, network policy manager (NPM) 230, video service manager (VSM) 240 and home router manager (HRM) 250. User devices 140 are not illustrated in FIG. 2 for simplicity. In addition, in some implementations, additional networks (not shown) may be included in network 100. For example, a network may be included between service provider 150 and broadband network gateway 220.

In an exemplary implementation, home router 210, ECB 215, STBs 120 and DVR 125 are located at a customer premises, such as a customer's home. In one implementation, STBs 120 and DVR 125 may be connected to each other and home router 210 via a wired connection, such as a multimedia over coax (MoCA) connection. Other devices in the home network, such as user devices 140, may connect to home router 210 via the MoCA connection using ECB 215 or another wired connection or interface device. Other devices in the home network, such as user devices 140, may also connect to home router 210 via wireless connections (e.g., WiFi, Bluetooth, etc.).

Home router 210, also referred to herein as broadband home router (BHR) 210 or residential gateway 210, may act as a hub for communications entering the customer's premises. For example, service provider 150 may communicate with one or more of the devices in a customer's home via network 160 to BHR 210. Similarly, BHR 210 may communicate with one or more devices at service provider 150 via network 160. BHR 210 may also communicate with STBs 120, DVR 125 and user devices 140 (not shown in FIG. 2) to manage bandwidth usage within the customer's home, as described in detail below.

ECB 215 may include a bridge or other network device that allows devices in the customer's home/home network to connect to home router 210 using an Ethernet protocol. For example, devices in the customer's home may receive and/or transmit content, such as video, music or multi-media content via ECB 215 using a MoCA connection.

Broadband network gateway (BNG) 220, also referred to herein as gateway router 220 may be located at service provider 150 or elsewhere in network 100. BNG 220 may facilitate communications between service provider 150 and BHR 210. For example, BNG 220 may transmit media streams from service provider 150 to BHR 210 via network 160. BNG 220 may also receive requests and other information from a customer premises transmitted by BHR 210 via network 160, as also described in detail below.

Service provider 150 may include network policy manager (NPM) 230, video service manager (VSM) 240 and home router manager (HRM) 250. NPM 230 may store business policy information associated with managing a large number of customer locations and network paths (e.g., thousands of customer locations and network paths). For example, NPM 230 may store information regarding various levels of service offered to customers. As an example, a first level of service may provide Internet services with a predetermined download speed and a predetermined upload speed. The first level of service may also provide television/video services that allow for a certain number of shows/movies to be simultaneously downloaded and/or viewed. Different levels of service may be provided based on the particular subscription level. In each case, NPM 230 may monitor customer locations, manage customer locations and/or provide for the management of customer locations to provide the appropriate service level.

VSM 240 may manage and provide video services, such as video-on-demand (VOD) services for customers. For example, VSM 240 may provide movies and/or televisions shows in response to requests from users input via the IMG displayed on one of televisions 110 via STBs 120 and/or DVR 125. NPM 230 and VSM 240 may interact to ensure that services provided to a customer premises meet the service level associated with that particular customer and service. HRM 250 may interact with NPM 230 to manage customer's home routers, such as BHR 210. For example, HRM 250 may forward bandwidth parameters to BHR 210 in accordance with a customer's service level, as described in detail below.

Figure 3:
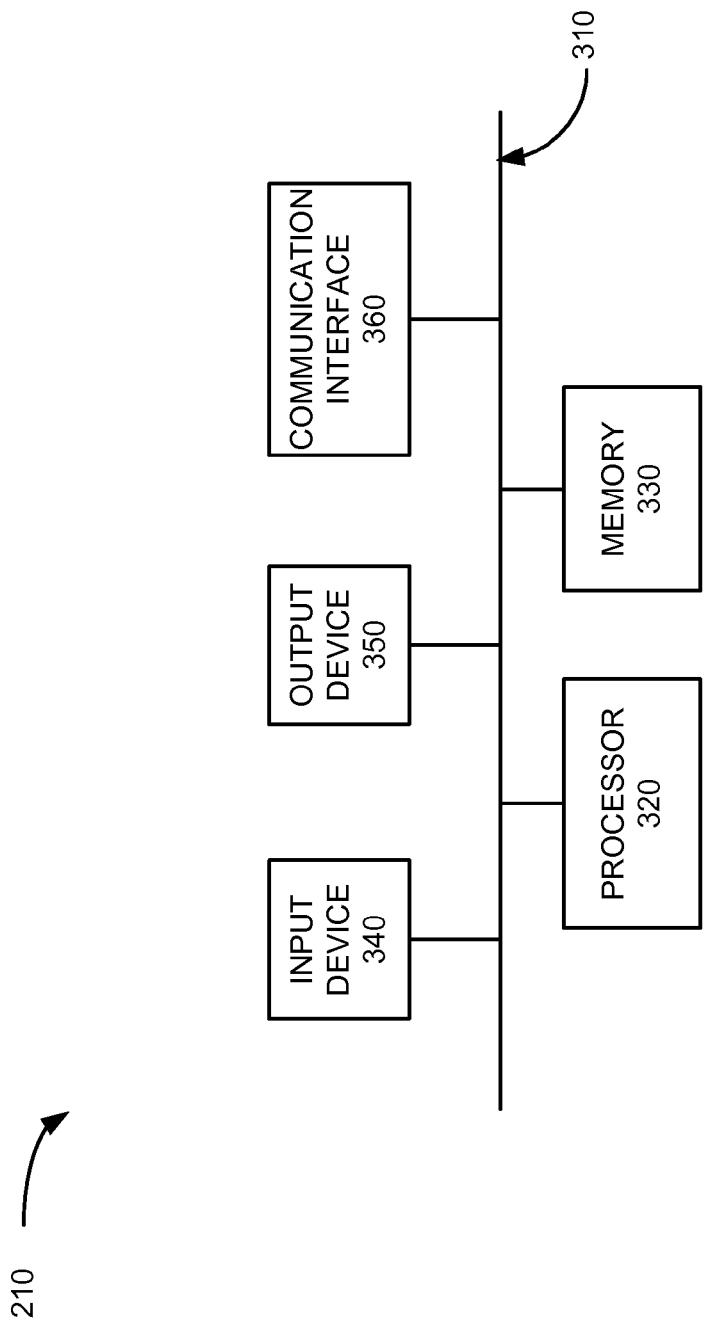
FIG. 3 illustrates an exemplary configuration of one or more of the components of FIG. 2.

FIG. 3 illustrates an exemplary configuration of home router (BHR) 210. One or more of STBs 120, DVR 125, service provider 150, gateway router 220, NPM 230, VSM 240 or HRM 250 may be configured in a similar manner. Referring to FIG. 3, BHR 210 may include a bus 310, a processor 320, a memory 330, an input device 340, an output device 350 and a communication interface 360. Bus 310 may include a path that permits communication among the elements of BHR 210.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to BHR 210, such as a keyboard, a keypad, a mouse, a pen, a microphone, a touch screen, voice recognition and/or biometric mechanisms, etc. Input device 340 may also include mechanisms for receiving input via a remote control device, such as remote control 130, which may sends commands to BHR 210 via IR or radio frequency signals. Output device 350 may include a mechanism that outputs information to the user, including a display, a printer, a speaker, etc.

Communication interface 360 may include one or more transceivers that BHR 210 may use to communicate with other devices in a customer premises or at service provider 150. For example, communication interface 360 may include mechanisms for communicating with STBs 120, DVR 125, user devices 140, ECB 215 and gateway router 220 via wired, wireless or optical mechanisms. Communication interface 360 may also include one or more radio frequency (RF) transmitters, receivers and/or transceivers and one or more antennas for transmitting and receiving RF data via network 160. Communication interface 360 may also include a modem or an Ethernet interface to a LAN or other mechanisms for communicating via a network, such as network 160 or another network via which HBR 210 communicates with other devices/systems.

The exemplary configuration illustrated in FIG. 3 is provided for simplicity. It should be understood that BHR 210 (and one or more of STBs 120, DVR 125, service provider 150, ECB 215, gateway router 220, NPM 230, VSM 240 or HRM 250) may include more or fewer devices than illustrated in FIG. 3. For example, various modulating, demodulating, coding and/or decoding components, one or more power supplies or other components may be included in BHR 210.

BHR 210 may perform processing associated with interacting with STBs 120, DVR 125, user devices 140, service provider 150, ECB 215 and other devices in network 100. For example, BHR 210 may perform processing associated with managing a user's home network. BHR 210 may perform these operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
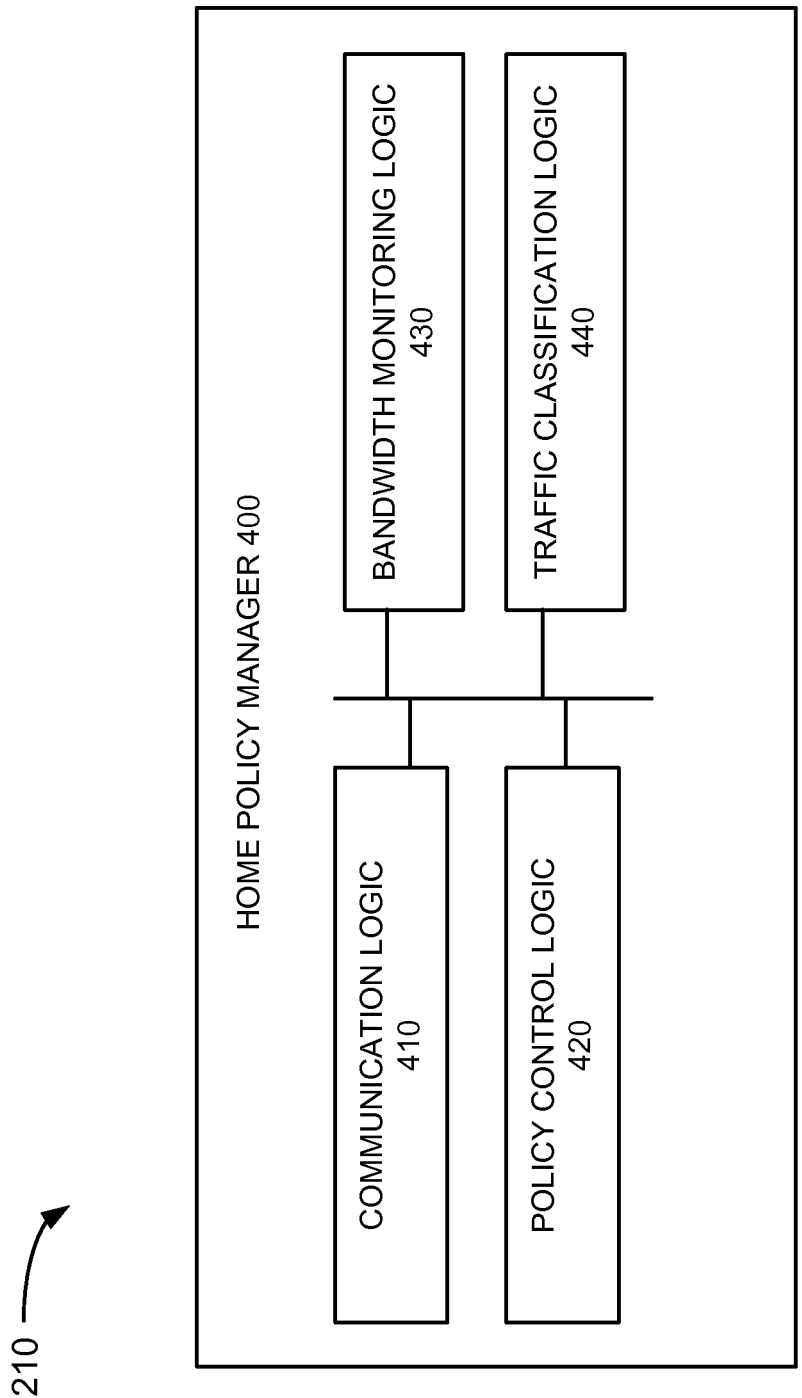
FIG. 4 illustrates an exemplary configuration of logic components implemented in one of the devices of FIG. 2.

FIG. 4 is an exemplary functional block diagram of components implemented in BHR 210 of FIG. 3. In an exemplary implementation, all or some of the components illustrated in FIG. 4 may be stored in memory 330. For example, all of some of the components associated with home policy manager (HPM) 400 may implemented by processor 320 executing software instructions stored in, for example, memory 330.

Referring to FIG. 4, HPM 400 may include communication logic 410, policy control logic 420, bandwidth monitoring logic 430 and traffic classification logic 440. HPM 400 and its various logic components are shown in FIG. 4 as being included in BHR 210. In alternative implementations, these components or a portion of these components may be located externally with respect to HPM 400 and/or BHR 210. For example, in some implementations, one or more of the components of HPM 400 may be located in devices external to BHR 210, such as in one of STBs 120, DVR 125 or another device. In still other implementations, one or more of the components illustrated in FIG. 4 may be located at service provider 150.

Communication logic 410 may include logic for communicating with other devices in network 160 or network 100. For example, communication logic 410 may receive requests for bandwidth from one of STBs 110 and/or DVR 125. Communication logic 410 may forward these requests to policy control logic 420, which may deny or grant the request, as described in more detail below. Communication logic 410 may also receive information, such as responses to requests, from service provider 150 via BNG 220.

Policy control logic 420 may include logic for managing a user's home network based on various policies stored in BHR 210. For example, policy control logic 420 may receive policy information from NPM 230 upon boot-up of BHR 210. NPM 230 may periodically update this information when changes occur in network, such as when a customer changes his/her level of service. Policy control logic 420 may store these parameters and manage the customer's bandwidth usage, as described in more detail below. For example, policy control logic 420 may allocate a certain amount of bandwidth within the home premises/network for different classes of traffic. As an example, policy control logic 420 may allocate a certain amount of bandwidth for video traffic from DVR 125 to STBs 120.

Bandwidth monitoring logic 430 may include logic to monitor a number of parameters associated with available bandwidth in a customer's home premises/network. For example, as described above, a customer may subscribe to a certain level of service provided by service provider 150. Bandwidth monitoring logic 430 may track or account for the customer's bandwidth usage in accordance with, for example, admission control information. In an exemplary implementation, bandwidth monitoring logic 430 may track or account for bandwidth usage and/or bandwidth admitted for different classes of traffic (e.g., class 1 traffic, class 2 traffic, etc.).

Traffic classification logic 440 may include logic that classifies traffic based on a number of parameters associated with, for example, Internet protocol (IP) traffic in a customer's home/home network. For example, traffic classification logic 440 may identify video traffic associated with receiving a video-on-demand from VSM 240 as class 1 traffic, identify in-home traffic between DVR 125 and STBs 120 as class 2 traffic, and identify traffic to/from user devices 140 and other devices in the customer's home network as class 3 traffic. In an exemplary implementation, traffic classification logic 440 may use the source and destination Internet protocol (IP) address, source and destination port numbers and the protocol type included with the traffic to identify and classify the traffic. In some implementations, traffic classification logic 440 may be located external to HPM 400, but within BHR 210. For example, in some implementations, the functions described above with respect to traffic classification logic 440 may be considered data plane functions that operate on user traffic, while HPM 400 functions may be considered to be control plane functions. In such implementations, traffic classification may be a function performed by BHR 210 that is not specific to or included in HPM 400.

Figure 5:
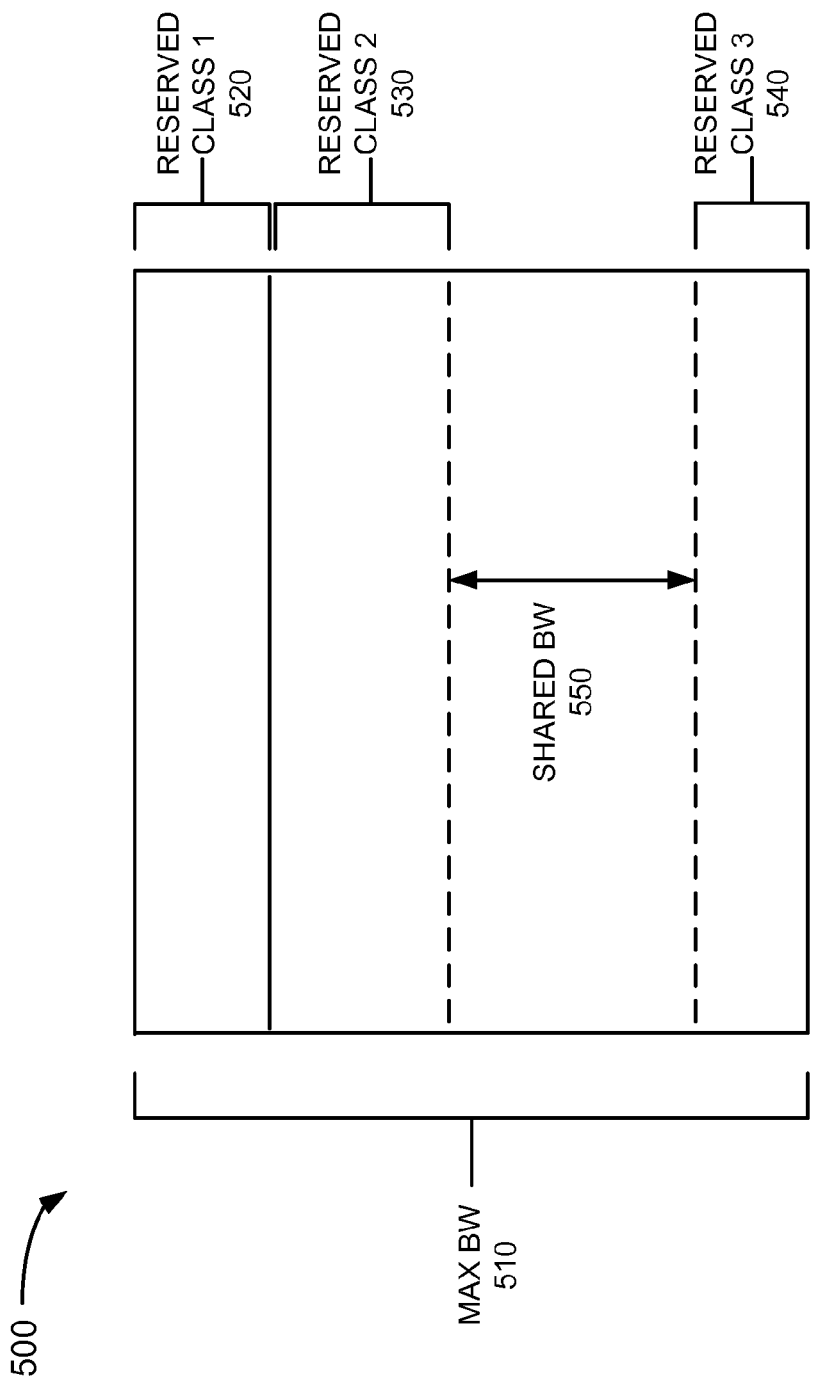
FIG. 5 is a schematic diagram illustrating portions of bandwidth for use by components illustrated in FIG. 2.

FIG. 5 schematically illustrates various bandwidth (BW) parameters associated with a user's home network. Referring to FIG. 5, block 500 includes maximum bandwidth 510, reserved class 1 bandwidth 520, reserved class 2 bandwidth 530, reserved class 3 bandwidth 540 and shared bandwidth

550. Maximum BW 510 represents the maximum bandwidth associated with the customer's home network.

Reserved class 1 bandwidth 520 may represent the minimum bandwidth reserved for class 1 traffic. As described above, in an exemplary implementation, class 1 traffic may correspond to VOD traffic from VSM 240 to DVR 125 and STBs 120 (e.g., VOD traffic on the MOCA medium connecting BHR 210 to DVR 125 and STBs 120). In one implementation, the maximum bandwidth available for class 1 traffic may be the sum of reserved class 1 bandwidth 520 and shared bandwidth 550 (e.g., 520+550).

Reserved class 2 bandwidth 530 may represent the minimum bandwidth reserved for class 2 traffic. As described above, in an exemplary implementation, class 2 traffic may correspond to traffic between DVR 125 and STBs 120. In one implementation, the maximum bandwidth available for class 2 traffic (e.g., the maximum bandwidth available for class 2 traffic on the MOCA medium connecting STBs 120 and DVR 125 to BHR 210) may be the sum of reserved class 2 bandwidth 530 and shared bandwidth 550 (e.g., 530+550). In other instances, the maximum bandwidth for class 2 traffic may be based on a subscription level associated with the particular customer.

Reserved class 3 bandwidth 540 may represent a minimum bandwidth reserved for the best effort traffic in the home network. Best effort traffic may refer to traffic associated with any number of user devices, such as user devices 140, STBs 110, DVRs 125, ECB 215 or other devices, attempting to access network bandwidth. In an exemplary implementation, best effort traffic may also include multicast traffic, such as Internet protocol television (IPTV) traffic. Bandwidth associated with best effort traffic may be granted in accordance with policies stored in policy control logic 420. Reserving a predetermined amount of BE bandwidth may ensure that a user's activities, such as Internet web browsing via one of user devices 140 is not starved while STBs 110 and/or DVR 125 are actively consuming bandwidth. In addition, the BE bandwidth may ensure that service provider 150 provides the appropriate level of data services to the customer. In one implementation, the maximum bandwidth available for class 3 traffic may be the sum of reserved class 3 bandwidth 540 and shared bandwidth 550 (e.g., 540+550).

Shared bandwidth 550 (shown between the dotted lines), may represent the bandwidth that may be shared between class 1, class 2 and class 3 traffic in a customer's home network. Bandwidth monitoring logic 430 may account for the available bandwidth associated with class 1, class 2 and class 3 traffic as bandwidth is being used/consumed, as described in detail below. For example, BHR 210, as described above, may manage a user's home network, including managing the bandwidth available to various devices, such as STBs 120, DVR 125, user device 140, ECB 215, etc. BHR 210 may also interact with service provider 150 to provision the bandwidth, as described in detail below.

Figure 6A:
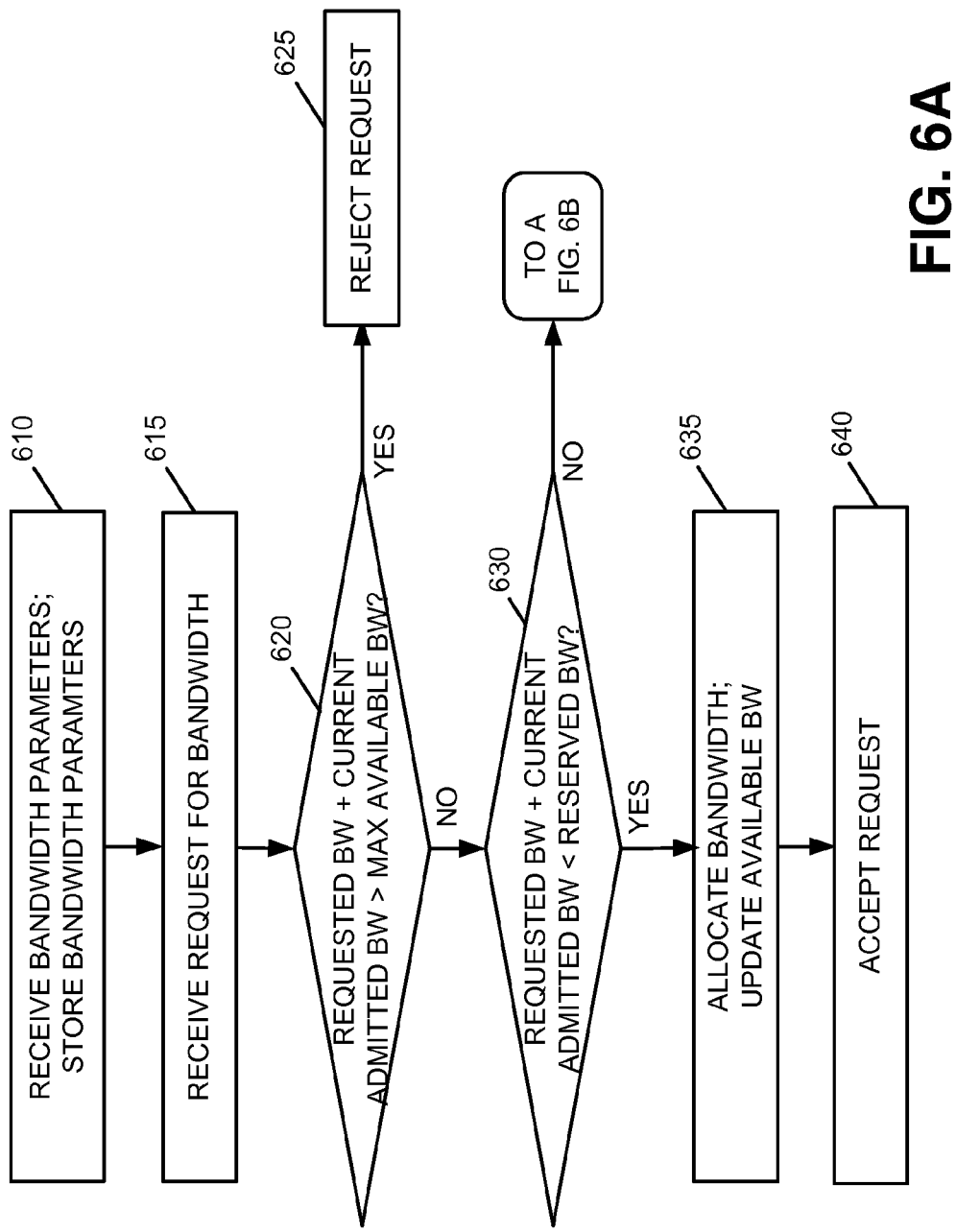
FIGS. 6A and 6B are flow diagrams illustrating exemplary processing by various devices illustrated in FIG. 2.
Figure 6B:
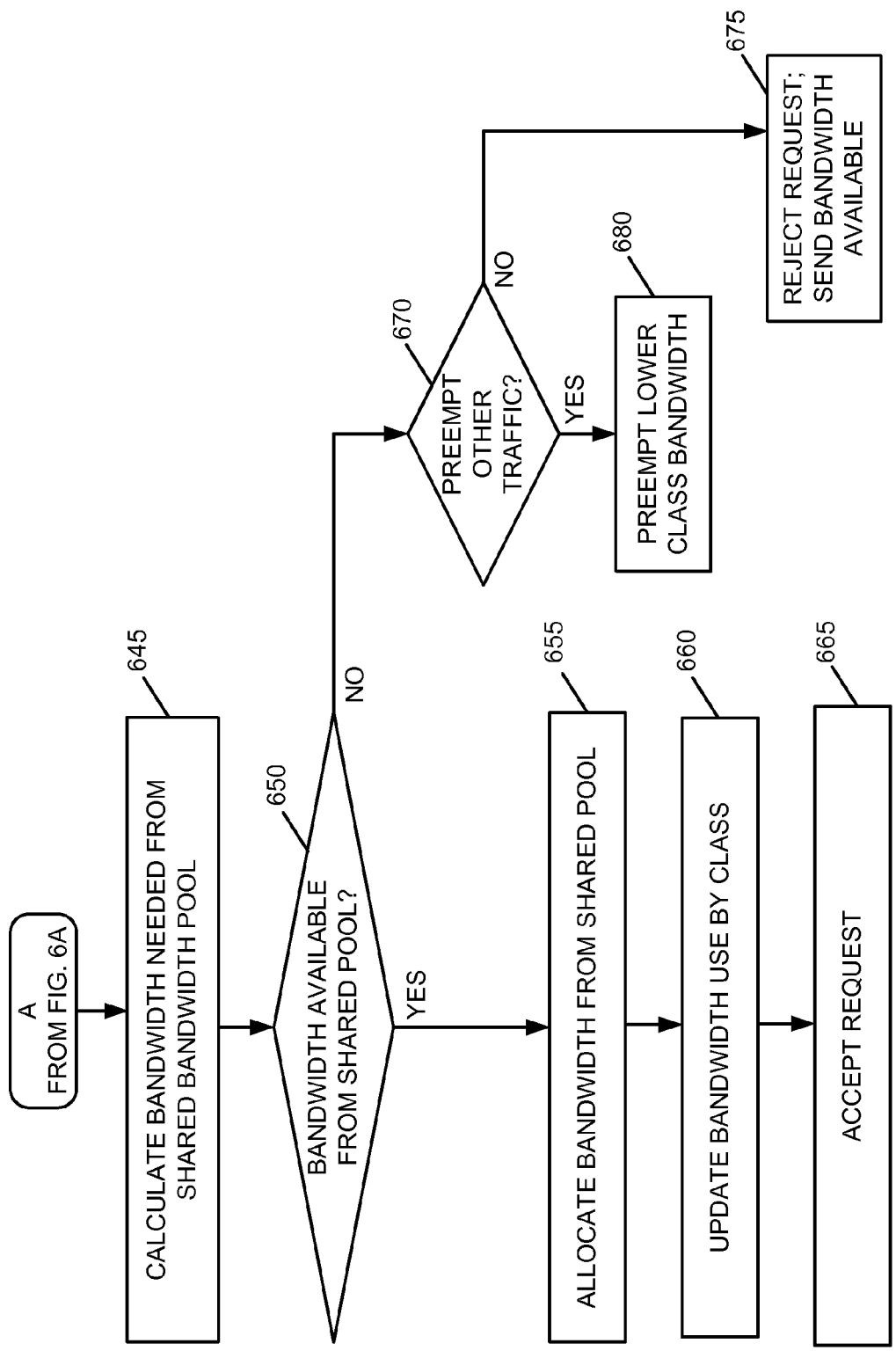
Figure 7:
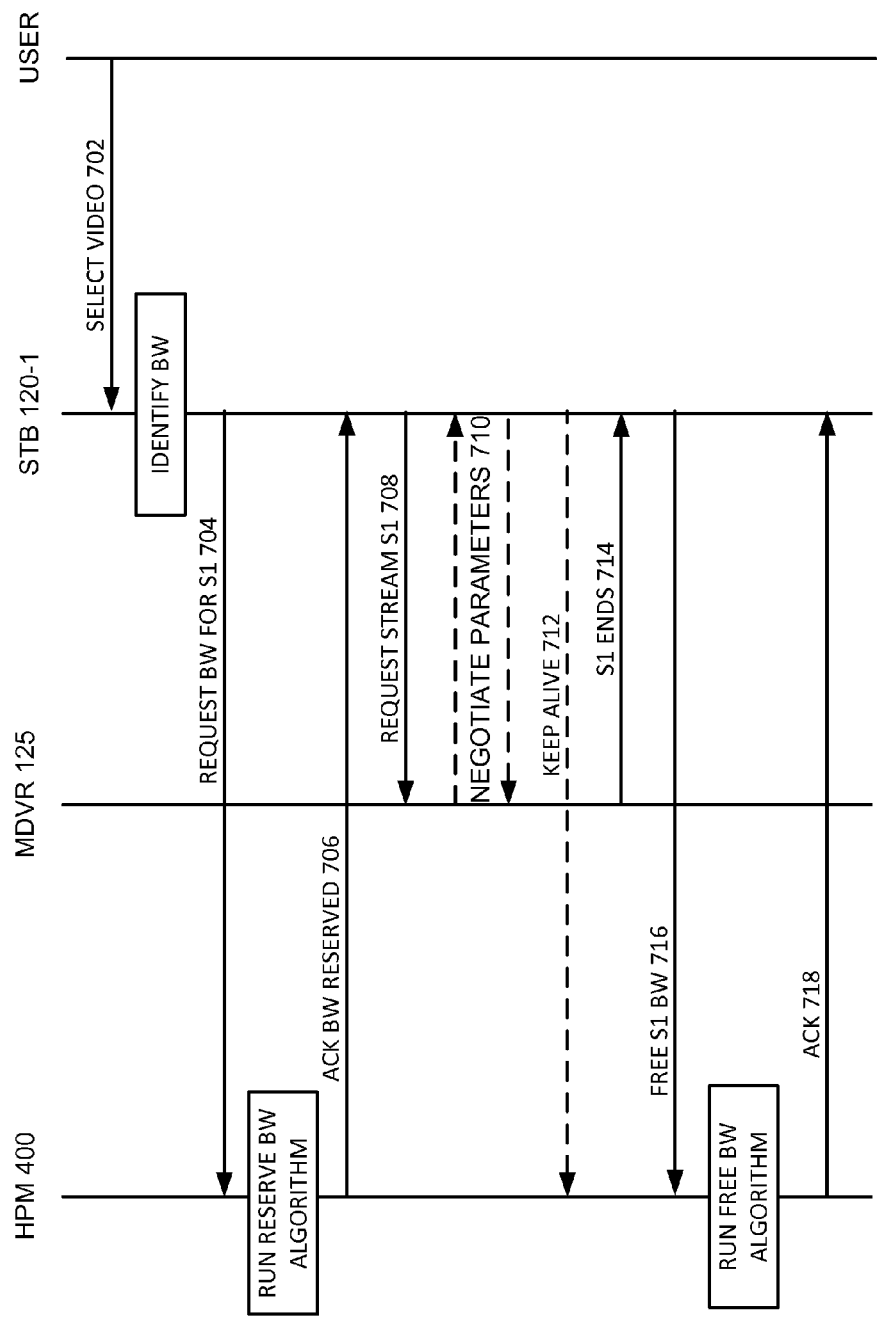
FIG. 7 is an exemplary signal flow diagram associated with the processing in FIGS. 6A and 6B.

FIGS. 6A and 6B are flow diagrams illustrating exemplary processing associated with network 100. FIG. 7 is a signal flow diagram of exemplary messages sent between devices in network 100 in connection with the processing illustrated in FIGS. 6A and 6B. In this example, assume that a user at STB 120-1 would like to watch a movie, such as high definition (HD) movie, stored on a device located within the customer's home, such as MDVR 125.

Processing may begin with BHR 210 booting up and receiving various bandwidth parameters from service provider 150 (act 610). For example, HRM 250 may transmit BW parameters to HPM 400 that include maximum bandwidth 510, reserved class 1 bandwidth 520, reserved class 2 bandwidth 530 and reserved class 3 bandwidth 540. In addition, HRM 250 may transmit parameters to HPM 400 that identify the maximum class 1 bandwidth, the maximum class 2 bandwidth and the maximum class 3 bandwidth. HPM 400 may store this information in memory 330 (act 610). This bootup procedure is performed to configure or update BHR 210 and may be independent from any user-initiated requests.

Assume that a user at STB 120-1 accesses a graphical user interface (e.g., an Interactive Media Guide (IMG)) displaying a listing of programs/movies stored on MDVR 125. As described above, MDVR 125 may allow users at STBs 120 to access stored videos/programs. In this case, further assume that the user selects a particular movie stored on MDVR 125 (FIG. 7, 702). In an exemplary implementation, the IMG stored on STB 120-1 may access a predefined application bandwidth table included with the IMG and/or stored elsewhere on STB 120-1 to determine the bandwidth requirements for the selected movie. As an example, the table may store information indicating that a standard definition movie may require a bandwidth of four megabits per second (Mb/s) and a high definition movie may require a bandwidth of 19 Mb/s. In each case, STB 120-1 (e.g., the IMG stored on STB 120-1) may forward a bandwidth request for the selected video, referred to herein as stream S1, to HPM 400 (704).

HPM 400 may receive the request (act 615). HPM 400 may determine whether the requested video bandwidth associated with stream S1 plus the current bandwidth usage for the particular class of traffic to which stream S1 belongs exceeds the maximum available bandwidth for that class of traffic (act 620). As described above, bandwidth monitoring logic 430 and/or traffic classification logic 440 may account for and/or monitor bandwidth admitted for or approved for each class of traffic. Policy control logic 420 may use the current bandwidth conditions to determine whether to grant the request.

For example, in this case, assume that traffic classification logic 440 categorizes a video session from STB 120-1 to MDVR 125 as class 2 traffic. In one implementation, traffic classification logic 440 may categorize the traffic based on control information prior to the flow of traffic. Policy control logic 420 may execute a reserve bandwidth algorithm and determine if the requested video bandwidth associated with stream S1 (e.g., REQ_BW) plus the current bandwidth admitted or approved for class 2 traffic is greater than the maximum limit for class 2 traffic (e.g., 530+550) (act 620). If so (act 620—yes), policy control logic 420 may reject the request (act 625). In some instances, HPM 400 may forward a message to STB 120-1 indicating that the available bandwidth is inadequate to fulfill the request at this time. Alternatively, HPM 400 may provide the user at STB 120-1 the option of receiving the video at a lower resolution level (e.g., a non-HD version).

If the requested bandwidth plus the current bandwidth admitted for class 2 traffic is not greater than the maximum available bandwidth for class 2 traffic (act 620—no), policy control logic 420 may determine whether the requested bandwidth plus the current bandwidth admitted for the particular class of traffic (i.e., class 2 traffic in this example) is less than the reserved bandwidth for the given class of traffic (act 630).

If policy control logic 420 determines that the requested bandwidth plus the current bandwidth admitted for class 2 traffic is not greater than the reserved class 2 bandwidth 530 (act 630—yes), policy control logic 420 may allocate or reserve the bandwidth (act 635). Policy control logic 420 may also update the available class 2 bandwidth to account for the requested bandwidth (act 635). HPM 400 may accept the request and send an acknowledgement to STB 120-1 indicating that the bandwidth has been reserved (act 640; FIG. 7, 706).

If policy control logic 420 determines that the requested bandwidth plus the current bandwidth admitted for class 2 traffic is not less than the reserved class 2 bandwidth 530 (act 630—no), policy control logic 420 may attempt to allocate bandwidth using bandwidth from the shared bandwidth 550. For example, policy control logic 420 may calculate the bandwidth needed from shared bandwidth 550 as the requested bandwidth minus the available reserved bandwidth for class 2 traffic (act 645). Policy control logic 420 may then determine whether bandwidth from shared bandwidth 550 is available to satisfy the request (act 650). If so (act 650—yes), policy control logic 420 may allocate the needed bandwidth from shared bandwidth 550 (act 655). Policy control logic 420 may also update the available class 2 bandwidth to account for the requested bandwidth (act 660). HPM 400 may accept the request and send an acknowledgement to STB 120-1 indicating that the bandwidth has been reserved (act 665).

In some implementations, if bandwidth is not available from shared bandwidth 550 (act 650—no), policy control logic 420 may determine whether traffic from other classes of traffic may be preempted to fulfill the user request (act 670). For example, in an exemplary implementation, bandwidth associated with lower priority traffic may be preempted or taken over for the purposes of fulfilling a request for bandwidth associated with higher priority traffic, as described in detail below.

Figure 8:
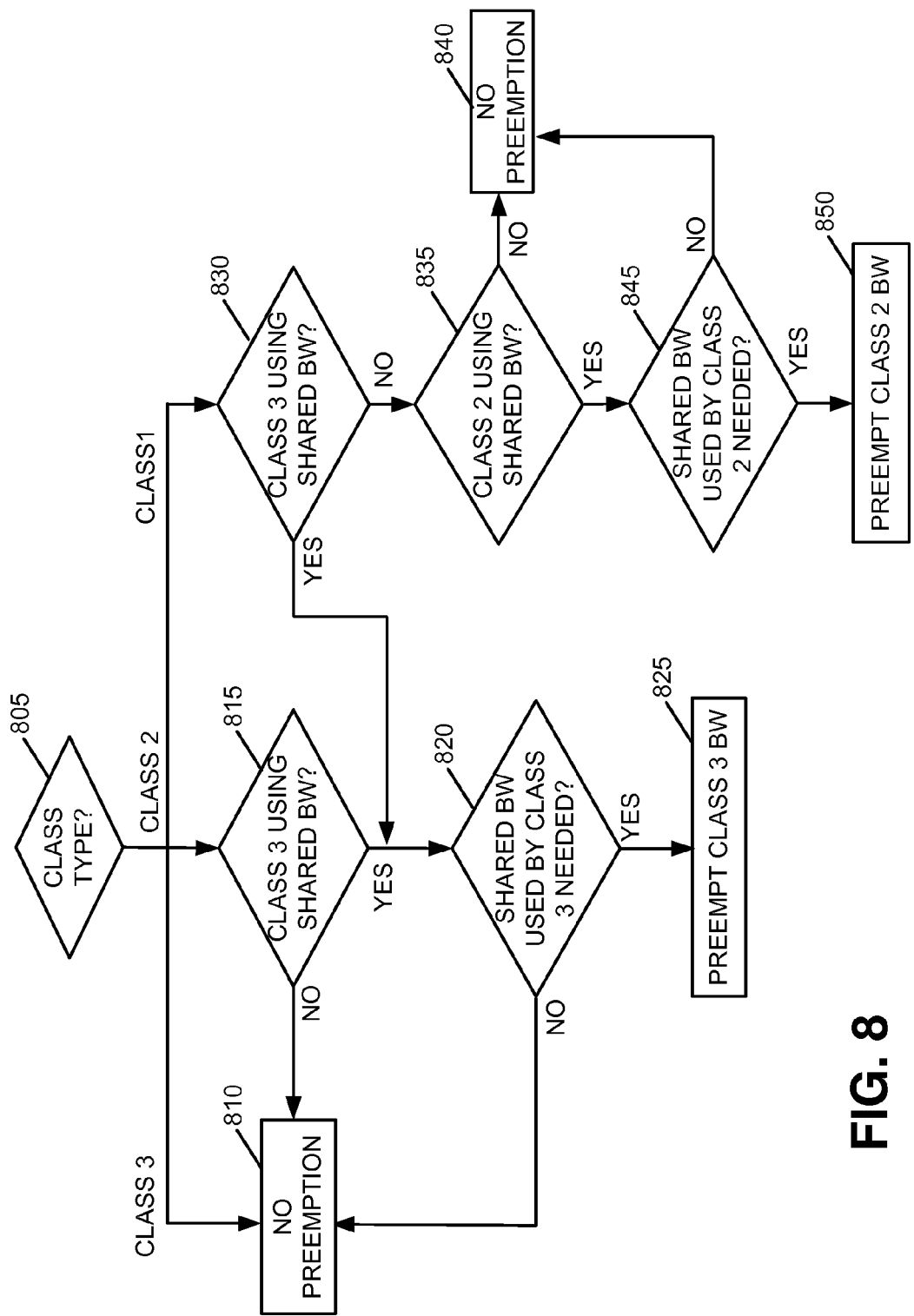
FIG. 8 is a flow diagram illustrating exemplary processing in connection with the processing of FIG. 6B.

FIG. 8 illustrates an exemplary flow diagram with respect to preempting traffic. Referring to FIG. 8, traffic classification logic 440 and/or policy control logic 420 may identify the traffic class type (act 805). If the traffic type is class 3 traffic, no preemption occurs (act 810). That is, class 3 traffic is the lowest traffic class and class 3 requests for bandwidth may not preempt class 2 or class 1 bandwidth.

If the traffic type is class 2 traffic, policy control logic 420 may determine if class 3 traffic is using shared bandwidth 550 (act 815). If so (act 815—yes), policy control logic 420 may determine whether the shared bandwidth used by class 3 traffic is needed to fulfill the request (act 820). That is, policy control logic 420 may determine whether shared bandwidth 550 used by class 3 traffic is needed to fulfill the request associated with stream S1. If so (act 820—yes), policy control logic 420 may preempt the class 3 traffic using shared bandwidth 550 for use by STB 120-1 to receive stream S1 (act 825). If no shared bandwidth 550 needed to fulfill the request for stream S1 is being used by class 3 traffic (act 820—no), no preemption occurs (act 810).

If the traffic type is class 1 traffic, policy control logic 420 may determine if class 3 traffic is using shared bandwidth 550 (act 830). If so (act 830—yes), policy control logic 420 may determine whether the shared bandwidth 550 used by class 3 traffic is needed to fulfill the request (act 820). If so (act 820—yes), policy control logic 420 may preempt the class 3 traffic using shared bandwidth 550 for use by STB 120-1 to receive stream S1 (act 825). If policy control logic 420 determines that no class 3 traffic is using shared bandwidth 550, policy control logic 420 may determine whether class 2 traffic is using shared bandwidth 550 (act 835). If so (act 835—yes), policy control logic 420 may determine whether shared bandwidth 550 used by class 2 traffic is needed to fulfill the request associated with stream S1. If so (act 845—yes), policy control logic 420 may preempt the class 2 traffic using shared bandwidth 550 for use by STB 120-1 to receive stream S1 (act 850). If no shared bandwidth is being used by class 2 traffic (act 835—no) or the shared bandwidth 550 used by class 2 traffic is not needed to fulfill the request (act 845—no), no preemption occurs (act 840). In this manner, policy control logic 420 may preempt class 3 traffic for class 2 traffic. Similarly, policy control logic 420 may preempt class 2 and class 3 traffic for class 1 traffic.

Referring back to FIG. 6B, if policy control logic 420 determines that traffic is not to be preempted to fulfill the request (act 670—no), HPM 400 may reject the request (act 675). In some implementations HPM 400 may also send a message to STB 120-1 indicating the available bandwidth and provide the user the option to receive media stream S1 at a lower resolution (act 675).

If, however, policy control logic 420 determines that traffic can be preempted as described above with respect to FIG. 8 (act 670—yes), policy control logic 420 may preempt lower class bandwidth to fulfill the request associated with stream S1 (act 680). As an example, policy control logic 420 may preempt all or a portion of shared bandwidth associated with class 3 traffic for use to service the request for class 2 bandwidth. In instances where lower priority traffic is preempted, HPM 400 may signal a device associated with the preempted traffic that bandwidth conditions are insufficient to continue a video/data session, for instance, and allow the user to terminate the session. In this manner, HPM 400 may provide an orderly transition period before preempting or shutting down a user session.

Referring back to FIG. 7, assume that the video stream request was accepted. STB 120-1 may send a request message to MDVR 125 requesting video stream S1 (708). MDVR 125 and STB 120-1 may negotiate parameters with respect to providing video stream S1 (710). For example, MDVR 125 and STB 120-1 may exchange information regarding the speed at which stream S1 will be sent, as well as other parameters associated with initiating the transmission of the stream. This information should match parameters allocated for stream S1. In each case, assume that MDVR 125 provides the video stream to STB 120-1. In some implementations, STB 120-1 may also transmit keep alive messages (712) to HPM 400 while, for example, MDVR 125 is forwarding a stream to STB 120-1.

Further assume that the video session ends (714). For example, the session may end when stream S1 has ended or may be triggered by the user ending the session. In either case, when the video session ends, policy control logic 420 may update the available video bandwidth (716). For example, bandwidth monitoring logic 430 may execute a free bandwidth algorithm to reallocate the bandwidth (FREE_BW) associated with provisioning stream S1 to STB 120-1 to the available bandwidth pool. That is, bandwidth monitoring logic 430 may determine whether shared bandwidth 550 was used to satisfy the request associated with stream S1. If so, bandwidth monitoring logic 430 may re-allocate the shared bandwidth back to shared bandwidth 550. If shared bandwidth was not used, or reserved bandwidth associated with the particular class of traffic was used, bandwidth monitoring logic 430 may add the freed bandwidth associated with stream S1 to the reserved class 2 bandwidth 530 and/or the shared bandwidth 550. Bandwidth monitoring logic 430 may add the freed bandwidth to reserved class 2 bandwidth 530 and/or shared bandwidth 550 based on whether the bandwidth associated with stream S1 was allocated from reserved class 2 bandwidth 530 and/or shared bandwidth 550. In some instances, reallocating the freed bandwidth may occur when the video session ends or when a video session times out. In either case, HPM 400 may execute the free bandwidth algorithm to reallocate the freed bandwidth (FREE_BW). HPM 400 may also send an acknowledgement to STB 120-1 indicating that the bandwidth has been re-allocated (718).

In this manner, HPM 400 may allocate resources within a customer's home network to ensure that the user is provided with adequate video resources in accordance with the customer's level of service and video stream bandwidth requirement. HPM 400 may also reallocate resources when conditions change within the customer's home network (e.g., when a video session has ended). The scenario described above refers to accessing a video stored on MDVR 125 within the user's home network.

Figure 9:
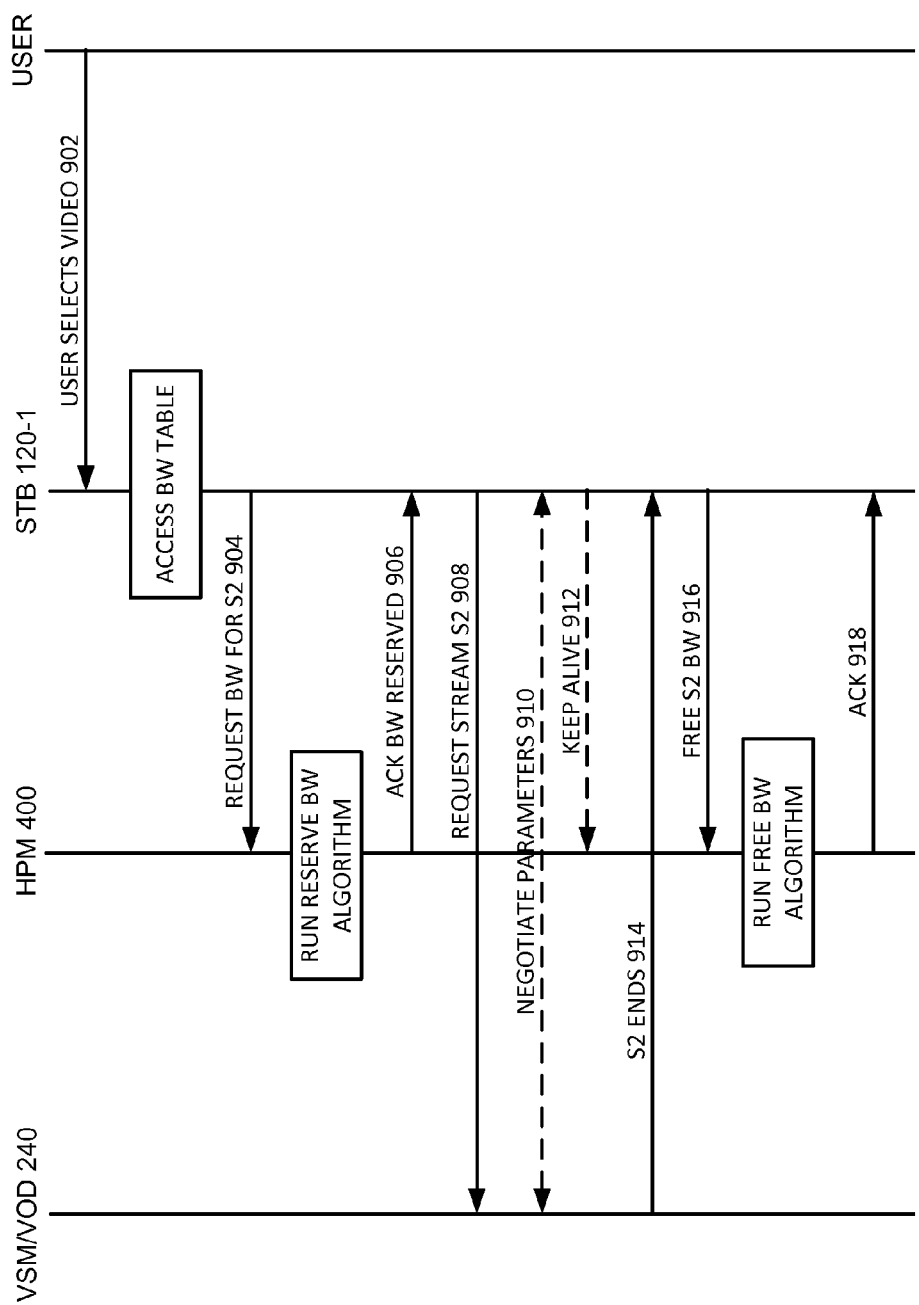
FIG. 9 is another exemplary signal flow diagram associated with processing by the devices illustrated in FIG. 2.

In other instances, a customer may request a video stream from service provider 150. For example, a customer may request a video stream from VSM 240. FIG. 9 illustrates an exemplary signal flow diagram for this scenario.

Referring to FIG. 9, a customer at STB 120-1 may interact with a user interface, such as an IMG stored on STB 120-1 to request a video (e.g., a movie) (902). As described previously, the IMG stored on STB 120-1 may access a predefined application bandwidth table included with the IMG and/or stored elsewhere on STB 120-1 to determine the bandwidth requirements for the selected movie (e.g., a high definition movie or a standard definition movie). STB 120-1 (e.g., the IMG stored on STB 120-1) may forward a bandwidth request for the selected video, referred to herein as stream S2, to HPM 400 (904).

HPM 400 may execute a reserve bandwidth algorithm to determine whether the request should be granted or denied. That is, HPM 400 may execute the same algorithm described above with respect to FIGS. 6A and 6B. For example, HPM 400 may access business policies to determine whether the customer is able to order videos-on-demand. HPM 400 may also determine whether the user's home network currently has adequate bandwidth to handle the ensuing video stream. That is, HPM 400 may identify the request for a video-on-demand as class 1 traffic and may determine whether the requested bandwidth is available in the manner described above with respect to FIGS. 6A and 6B.

In this example, assume that HPM 400 determines that the bandwidth for stream S2 is available. HPM 400 may send an acknowledgement message to STB 120-1 indicating that the bandwidth for stream S2 has been reserved (906). STB 120-1 may then forward a request for stream S2 to VSM 240 and/or a VOD server associated with service provider 150 (908). VSM/VOD 240 and STB 120-1 may negotiate parameters associated with stream S2 (910). For example, VSM 240 and STB 120-1 may exchange information regarding the speed at which stream S2 will be sent, as well as other parameters associated with initiating the transmission of the stream. This information should be consistent with reserved class 1 bandwidth 520. In each case, assume that VSM 240 provides the video stream to STB 120-1. In some implementations, STB 120-1 may also transmit keep alive messages (912) to HPM 400 while, for example, VSM 240 is forwarding a stream to STB 120-1.

When the video session ends or the video session times out, VSM 240 signals STB 120-1 (914) indicating that the video session has ended. For example, the session may end when stream S2 has ended or may be triggered by the user ending the session. In each case, when the video session ends or times out, STB 120-1 may signal HPM 400 that the bandwidth associated with the video stream should be freed (916).

HPM 400 may execute a free bandwidth algorithm to reallocate the freed bandwidth. The free bandwidth algorithm executed by HPM 400 may be the same as that described in detail with respect to FIG. 7. That is, HPM 400 may re-allocate bandwidth associated with stream S2 to reserved class 1 bandwidth 520 and/or shared bandwidth 550 based on whether reserved class 1 bandwidth and/or shared bandwidth 550 was used to fulfill the request. After re-allocating the bandwidth, HPM 400 may also send an acknowledgement message to STB 120-1 indicating that the bandwidth has been re-allocated (918).

In this manner, requests for data streams/video sessions from devices located outside a customer's home network (e.g., from VSM 240) are handled in a similar manner as requests for video streams internal to the customer's home network. That is, bandwidth decisions are made, for example, by HPM 400 implemented in BHR 210 within the user's home network.

Implementations described herein provide network bandwidth management for a customer's home network. Distributing some or all or some of the management decisions to a device in the user's home network may reduce overhead in the network. In addition, distributing some or all of the decision making may result in a reduced time needed to fulfill various customer requests.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, all or some of the decision-making with respect to managing a customer's home network was distributed to a device in the customer's home. In other implementations, some of the decision-making described as being performed at BHR 210 may be performed at NPM 230. That is, HPM 400 may communicate all requests to NPM 230 to manage the requests. In such scenarios, the centralized service provider may be responsible for managing the customer's bandwidth. Such implementations involving a centralized management device may be useful when the processing capability at the customer's location in not adequate to handle the network management related decision making.

In addition, features have been described above with respect to STBs 120 and/or DVRs 125 consuming bandwidth. It should be understood that other devices may also compete for network bandwidth. For example, user devices 140 may access network bandwidth via, for example, ECB 215 or via wireless connections. In addition, other devices, such as a camera used for home monitoring, may compete for network bandwidth. Still further, other devices (e.g., a Slingbox®) that send television content to one of televisions 110 may compete for network bandwidth. In each case, HPM 400 may manage requests for bandwidth, as described in detail above.

In addition, while series of acts have been described with respect to FIGS. 6A, 6B and 8, and series of signal flows have been described with respect to FIGS. 7 and 9, the order of the acts and/or signal flows may be varied in other implementations. Moreover, non-dependent acts and/or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   storing, at a first network device configured to communicate with at least one set top box (STB) and at least one digital video recorder (DVR), information identifying a plurality of parameters associated with bandwidth in a home network, wherein the plurality of parameters identify a reserved bandwidth associated with each of a plurality of classes of traffic and a shared bandwidth that can be shared between each of the plurality of classes of traffic and wherein the plurality of classes of traffic include a first class of traffic corresponding to video on demand traffic, a second class of traffic corresponding to traffic between the at least one DVR and the at least one STB, and a third class of traffic corresponding to best effort traffic;
   receiving, at a first network device in the home network, a request having a corresponding first bandwidth;
   identifying a class of traffic associated with the request, wherein the identified class of traffic corresponds to the first class of traffic, the second class of traffic or the third class of traffic;
   determining whether the first bandwidth is less than an available bandwidth associated with the identified class of traffic;
   approving the request in response to determining that the first bandwidth is less than the available bandwidth associated with the identified class of traffic;
   modifying the available bandwidth associated with the identified class of traffic in response to approving the request; and
   determining, in response to determining that the first bandwidth is not less than an available bandwidth associated with the identified class of traffic, whether the shared bandwidth is available to fulfill the request.

2. The method of claim 1, wherein the plurality of parameters comprises:
   a first bandwidth reserved the first class of traffic,
   a second bandwidth reserved for the second class of traffic,
   a third bandwidth reserved for the third class of traffic, and
   a maximum bandwidth available for each of the first, second and third classes of traffic.

3. The method of claim 1, further comprising:
   determining, in response to determining that the shared bandwidth is not available to fulfill the request, whether bandwidth associated with traffic having a lower priority than a priority associated with the identified class of traffic is available to fulfill the request.

4. The method of claim 3, further comprising:
   approving the request, when bandwidth associated with traffic having the lower priority is available to fulfill the request; and
   using shared bandwidth associated with traffic having the lower priority to fulfill the request.

5. The method of claim 1, wherein the request corresponds to a request for a video stored in a first one of the at least one DVR, the method further comprising:
   initiating a video session to forward the video from the first DVR to a first one of the at least one STB in response to approving the request.

6. The method of claim 5, further comprising:
   adjusting the available bandwidth associated with at least one of the identified class of traffic or shared bandwidth when the video session has ended.

7. The method of claim 1, wherein the request corresponds to a request for a video stored on a device located externally from the home network, the method further comprising:
   preempting, when the first bandwidth is not less than an available bandwidth associated with the identified class of traffic, bandwidth being used by a lower priority class of traffic than the identified class of traffic to fulfill the request.

8. The method of claim 1, wherein the identifying a class of traffic comprises identifying at least one of video on demand traffic, video traffic between the at least one DVR and the at least one STB, and traffic from other devices connected to the home network.

9. The method of claim 1, wherein the method is implemented as computer-executable instructions embodied on a computer-readable memory device.

10. The method of claim 1, wherein the identifying a class of traffic associated with the request comprises at least one of identifying a source and destination address associated with the request, identifying a source and destination port number associated with the request or identifying a protocol type associated with the request.

11. A device, comprising:
    a memory configured to store a plurality of bandwidth parameters associated with a network, wherein the plurality of bandwidth parameters identify a reserved bandwidth associated with each of a plurality of classes of traffic and a shared bandwidth that can be shared between each of the plurality of classes of traffic;
    a communication interface configured to:
       receive programming from a service provider, and
       receive requests for access to network bandwidth from a plurality of devices, the plurality of devices including at least one set top box (STB) and at least one digital video recorder (DVR), wherein the plurality of classes of traffic include a first class of traffic corresponding to video on demand traffic, a second class of traffic corresponding to traffic between the at least one digital video recorder (DVR) and the at least one set top box (STB), and a third class of traffic corresponding to best effort traffic; and
    logic configured to grant or deny the requests based on the stored bandwidth parameters, wherein when granting or denying requests, the logic is configured to:
       identify a class of traffic associated with a first request, wherein the identified class of traffic corresponds to the first class of traffic, the second class of traffic or the third class of traffic, determine whether a first bandwidth associated with fulfilling the first request is less than an available bandwidth associated with the identified class of traffic, determine, in response to determining that the first bandwidth associated with fulfilling the first request is not less than the available bandwidth associated with the identified class of traffic, whether the shared bandwidth is available to fulfill the first request, and use the shared bandwidth to fulfill the first request, in response to determining that the shared bandwidth is available to fulfill the first request.

12. The device of claim 11, wherein the first request comprises a request from a first one of the at least one STB for programming stored on a first one of the least one DVR.

13. The device of claim 12, wherein the logic is further configured to:

approve the first request when the first bandwidth is less than the available bandwidth associated with the identified class of traffic, modify an available bandwidth parameter associated with the identified class of traffic stored in the memory in response to approving the first request, and update the available bandwidth parameter in response to an indication that a video session associated with the first request has ended.

14. The device of claim 11, wherein the first request comprises a request from the at least one STB or the at least on DVR for a video stored at a location external to a home network associated with the device, wherein the logic is configured to:

determine, when shared bandwidth is not available to fulfill the first request, whether bandwidth associated with traffic having a lower priority than the identified class of traffic is available to fulfill the first request.

15. The device of claim 11, wherein the plurality of bandwidth parameters comprise at least three parameters associated with bandwidths reserved for the first, second and third classes of traffic.

16. The device of claim 11, wherein the device comprises a router or a set top box.

17. The device of claim 11, wherein when identifying a class of traffic associated with the first request, the logic is configured to at least one of identify a source and destination address associated with the first request, identify a source and destination port number associated with the first request or identify a protocol type associated with the first request.

18. A non-transitory computer-readable medium having stored thereon sequences of instructions which, when executed by at least one processor, cause the at least one processor to:

store a plurality of parameters associated with managing bandwidth in a home network, wherein the plurality of parameters identify a shared bandwidth that can be shared between each of a plurality of classes of traffic, wherein the plurality of parameters comprise a first bandwidth reserved for a first class of traffic associated with video on demand traffic, a second bandwidth reserved for a second class of traffic associated with traffic between at least one digital video recorder and one or more set top boxes, and a third bandwidth reserved for a third class of traffic associated with multicast or best effort traffic;

receive a request having a corresponding first bandwidth;

identify a class of traffic associated with the request wherein the identified class of traffic corresponds to the first class of traffic the second class of traffic or the third class of traffic;

determine, based on a first one of the stored parameters, whether the first bandwidth is less than an available bandwidth associated with the identified class of traffic;

approve the request when the first bandwidth is less than the available bandwidth;

modify the first parameter in response to approving the request; and determine, in response to determining that the first bandwidth is not less than the available bandwidth associated with the identified class of traffic, whether the shared bandwidth is available to fulfill the request.

19. The non-transitory computer-readable medium of claim 18, further including instructions for causing the at least one processor to:

receive information indicating that a video session involving a first device and a second device in the home network has ended; and update the first parameter stored in the memory in response to the information indicating that the video session has ended.

* * * * *